(12) United States Patent
Robert et al.

(10) Patent No.: US 6,795,691 B2
(45) Date of Patent: Sep. 21, 2004

(54) VARIABLE-POWER TRANSCEIVING DEVICE

(75) Inventors: Jean-Luc Robert, Betton (FR); Sophie Bouvet, Rennes (FR)

(73) Assignee: Thomson Licensing S.A., Boulogne (FR)

(*) Notice: Subject to any disclaimer, the term of this patent is extended or adjusted under 35 U.S.C. 154(b) by 282 days.

(21) Appl. No.: 10/075,567

(22) Filed: Feb. 13, 2002

(65) Prior Publication Data

US 2002/0111145 A1 Aug. 15, 2002

(30) Foreign Application Priority Data

Feb. 15, 2001 (FR) .............................. 01 02197

(51) Int. Cl.⁷ .............................................. H04B 1/02
(52) U.S. Cl. .......................... 455/91; 455/24; 455/428; 375/195; 375/219
(58) Field of Search ........................ 455/91, 116, 129, 455/7, 20, 21, 24, 403, 428, 39, 73, 553, 95, 88; 375/195, 219

(56) References Cited

U.S. PATENT DOCUMENTS

| | | | | |
|---|---|---|---|---|
| 4,667,243 A | * | 5/1987 | Blatter et al. .................. 725/68 |
| 5,325,401 A | * | 6/1994 | Halik et al. .................. 375/329 |
| 5,410,747 A | * | 4/1995 | Ohmagari et al. ........... 455/118 |
| 5,528,633 A | * | 6/1996 | Halik et al. .................. 375/326 |
| 6,052,568 A | * | 4/2000 | Williams ..................... 455/126 |
| 6,154,181 A | * | 11/2000 | Hu-Guo et al. .............. 343/772 |
| 6,208,846 B1 | * | 3/2001 | Chen et al. .............. 455/127.3 |
| 6,262,690 B1 | * | 7/2001 | Malone et al. .............. 343/850 |
| 6,366,620 B1 | * | 4/2002 | Jackson et al. ............. 375/308 |
| 6,625,222 B1 | * | 9/2003 | Bertonis et al. ............. 375/259 |
| 6,665,296 B1 | * | 12/2003 | Sturza et al. ................ 370/389 |

FOREIGN PATENT DOCUMENTS

| | | | |
|---|---|---|---|
| EP | 0800314 A1 | 4/1997 | ............. H04N/7/20 |
| EP | 0853391 A2 | 7/1998 | ........... H04B/7/005 |
| EP | 1076420 A1 | 3/1999 | ............. H04B/1/04 |
| WO | 99/09762 | 2/1999 | ............. H04Q/7/20 |

* cited by examiner

*Primary Examiner*—Cong Van Tran
(74) *Attorney, Agent, or Firm*—Joseph S. Tripoli; Robert B. Levy

(57) ABSTRACT

The invention relates to a transmission or transmission/reception device having a transmission path structure which makes it possible to increase the range of variation of the transmission power without degrading the signal-to-noise ratio. The attenuation is achieved in part in an internal unit 5 and in part in an external unit 4 with the aid of a switching circuit 25 which selectably couples an antenna between an output or an input of an amplifier.

18 Claims, 5 Drawing Sheets

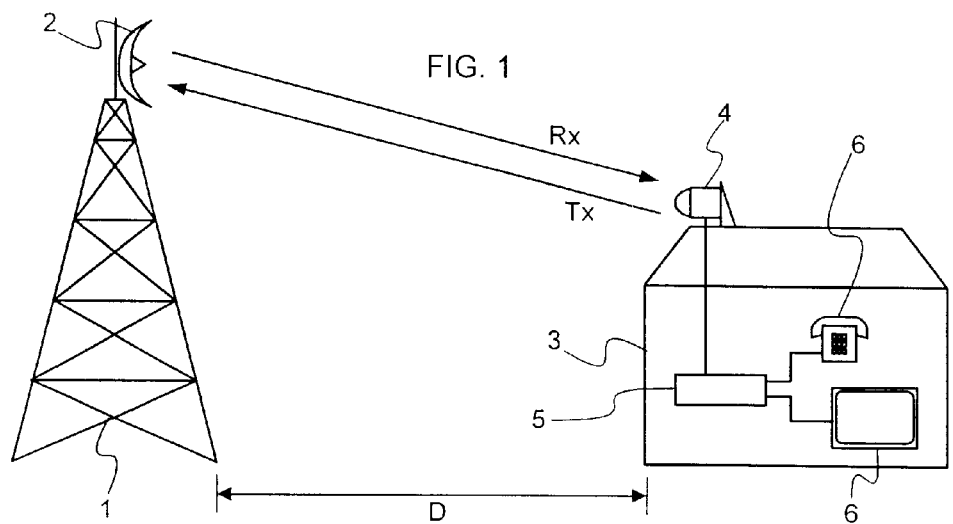
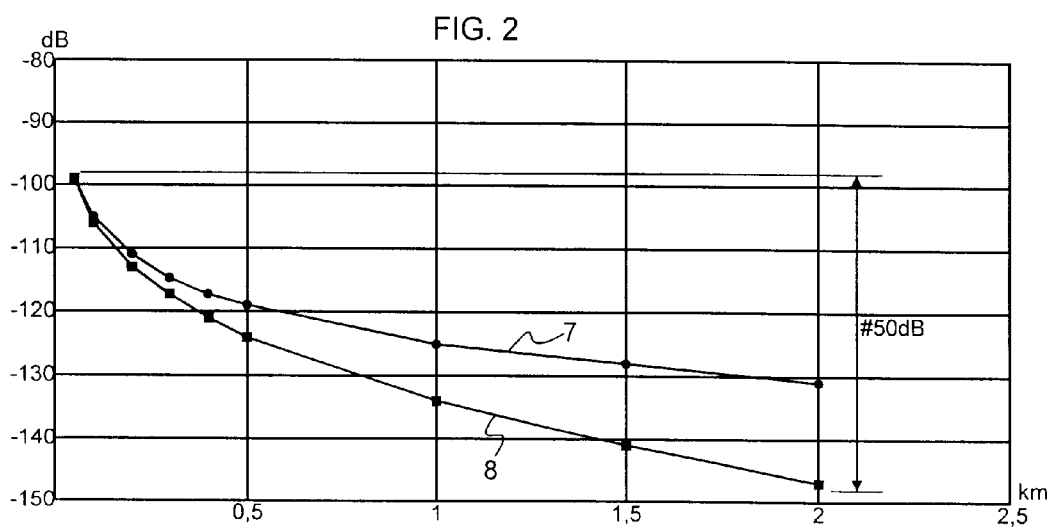

VARIABLE-POWER TRANSCEIVING DEVICE

BACKGROUND OF THE INVENTION

The invention relates to a transmission device of variable power. More particularly, the invention pertains to a transmission device having a very wide range of power variation.

Within the framework of wide-bandwidth wireless networks, it is known practice to use ever higher frequencies in order to allow the transmission of high bit rate applications such as video. These networks are also intended to allow data exchanges between at least one base station and a plurality of subscribers. These networks are commonly referred to as point-multipoint networks.

The point-multipoint type radio transmission systems are known to the person skilled in the art by the acronyms MMDS (standing for Microwave Multipoint Distribution System), LMDS (standing for Local Multipoint Distribution System) and MVDS (standing for Multipoint Video Distribution System). These systems used for the broadcasting of programmes permit a return path to the subscriber terminals which allows the subscriber to interact with the programme received. At present, the MPT-1560-RA standard provides for the use of frequencies situated between 40.5 and 42.5 GHz.

FIG. 1 illustrates an LMDS type system. A broadcasting station 1 furnished with a transmission/reception antenna 2 broadcasts information destined for a plurality of subscribers 3. Each subscriber 3 has an external unit 4, consisting of an antenna and means for transposing the signal received or the signal to be transmitted to an intermediate frequency, and an internal unit 5 which comprises means of channel selection in transmission and in reception as well as various means of coding/decoding for exchanging data with at least one user apparatus 6, for example a television set, a telephone or a personal computer.

Transmissions in millimetre bands are strongly dependent on time, on atmospheric conditions, and on the distance D separating the subscriber 3 from the broadcasting station 1. FIG. 2 represents the attenuation to a 40 GHz (giga Hertz) transmission as a function of distance. Curve 7 represents the attenuation in good weather and curve 8 represents the attenuation during rain. As may be observed by the person skilled in the art, the attenuation varies by around 50 dB as the distance varies from 50 m to 2 km.

Now, a base station is used for several subscribers and the subscribers must transmit with the least power so as not to saturate the reception of the base station and jam the other subscribers. It is therefore necessary to have an adjustment of the transmission power level for each subscriber. A dialogue between the broadcasting station and the device placed at the subscriber's home makes it possible to adjust the transmission power.

FIG. 3 represents an exemplary embodiment of the transmitter part of the device placed at the subscriber's home, according to the state of the art. The internal or first unit 5 comprises means of modulation 10 which receive a signal to be modulated. A mixer 11 is connected to the modulation means 10 so as to transpose the modulated signal into an intermediate frequency band, a voltage-controlled oscillator 12 delivering the transposition signal. The output of the mixer 11 is coupled to an amplification facility which comprises one or more amplifiers 13 and a variable-gain attenuation circuit 14. A supervisory circuit 15 sends the various control signals to the modulation means 10 to the controlled oscillator 12 and to the attenuation circuit 14. A coaxial cable is connected at the output of the amplification facility so as to transport the signal to the external or second unit 4. The external unit 4 comprises a first filter 16 connected to the coaxial cable and to a mixer 17. A local oscillator 18 delivers a transposition frequency to the mixer. A second filter 19 eliminates the image frequencies originating from the mixer 17. An amplifier of SSPA type (standing for Solid State Power Amplifier) amplifies the signal before delivering it to an antenna 21.

In the circuit of FIG. 3, the adjustment of the transmission gain is carried out in the internal unit 5 with the aid of the attenuation circuit 14. One problem is that the adjustment of the power with the aid of the attenuator 14 alters the signal-to-noise ratio. It is not possible to have more than 35 dB of power variation if one wishes to comply with a signal-to-noise ratio of at least 25 dB.

SUMMARY OF THE INVENTION

The invention proposes a transmission path structure which makes it possible to increase the range of variation of the transmission power without degrading the signal-to-noise ratio. The attenuation is carried out in part in the internal unit and in part in the external unit by switching an amplifier.

In a first inventive arrangement a transmission device comprising: an internal unit which modulates data to be transmitted and transposes them into an intermediate frequency band and which comprises means of variable attenuation; an external unit which transposes at least one intermediate band signal into a transmission frequency band, the said external unit comprising at least one amplifier linked to an antenna; and a linking cable which links the external unit and the internal unit. The external unit comprises a switching circuit arrangement for coupling the amplifier output to the antenna or coupling the amplifier input to the antenna.

In a second inventive arrangement a transmission/reception device comprising: an internal unit which, on the one hand, modulates data to be transmitted and transposes them into an intermediate frequency band and which comprises means of variable attenuation, and, on the other hand, transposes and demodulates data received; an external unit which transposes at least one intermediate band signal into a transmission frequency band and at least one signal received in a reception band into the intermediate band, the external unit comprising at least one amplifier linked to an antenna for the transmission of data; a linking cable which links the external unit and the internal unit. The external unit comprises a switching circuit for selectably coupling or bypassing the amplifier to the antenna.

According to a particular embodiment, the internal unit comprises means for delivering a switching signal to the external unit and the external unit comprises means for receiving the switching signal and controlling the switching circuit. This embodiment permits the control of switching in the external unit by the internal unit.

Preferably, the means of variable attenuation make it possible to have a greater range of variation of attenuation than the amplification change achieved by the amplifier bypass switch. Thus, it is possible to switch the external unit between two signal bursts without impeding transmission.

BRIEF DESCRIPTION OF THE DRAWINGS

The invention will be better understood, and other features and advantages will become apparent on reading the description which follows, the description making reference to the appended drawings among which:

FIG. 1 represents a point-multipoint type transmission system,

FIG. 2 represents curves of signal attenuation versus distance,

DETAILED DESCRIPTION

Figure 3:
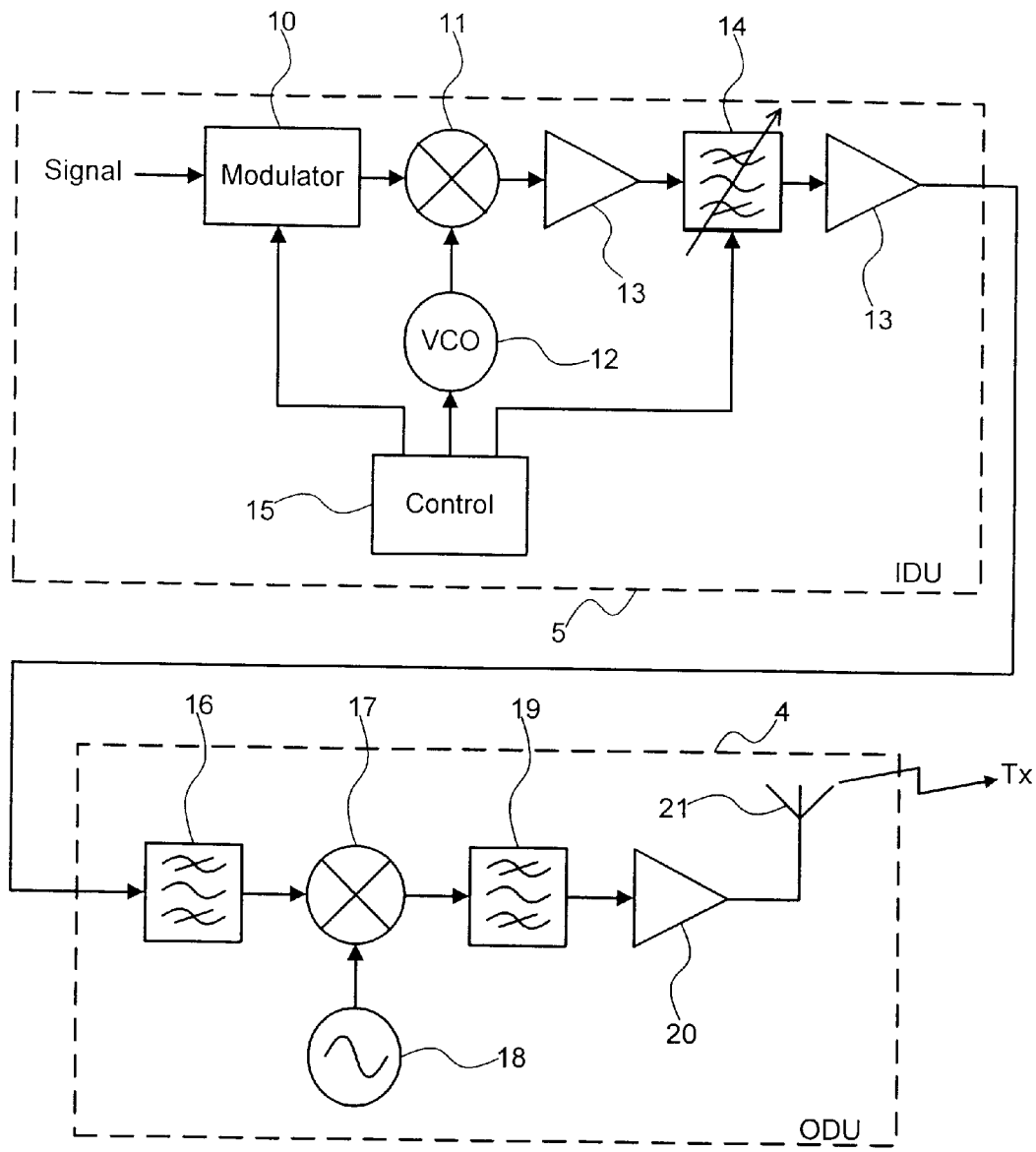
FIG. 3 represents the circuits serving for the transmission of data of a subscriber terminal of the system of FIG. 1, according to the state of the art.

FIGS. 1 to 3 described above will not be detailed subsequently. To improve the understanding of the person skilled in the art, the same references are used for similar elements catering for the same function.

Figure 4:
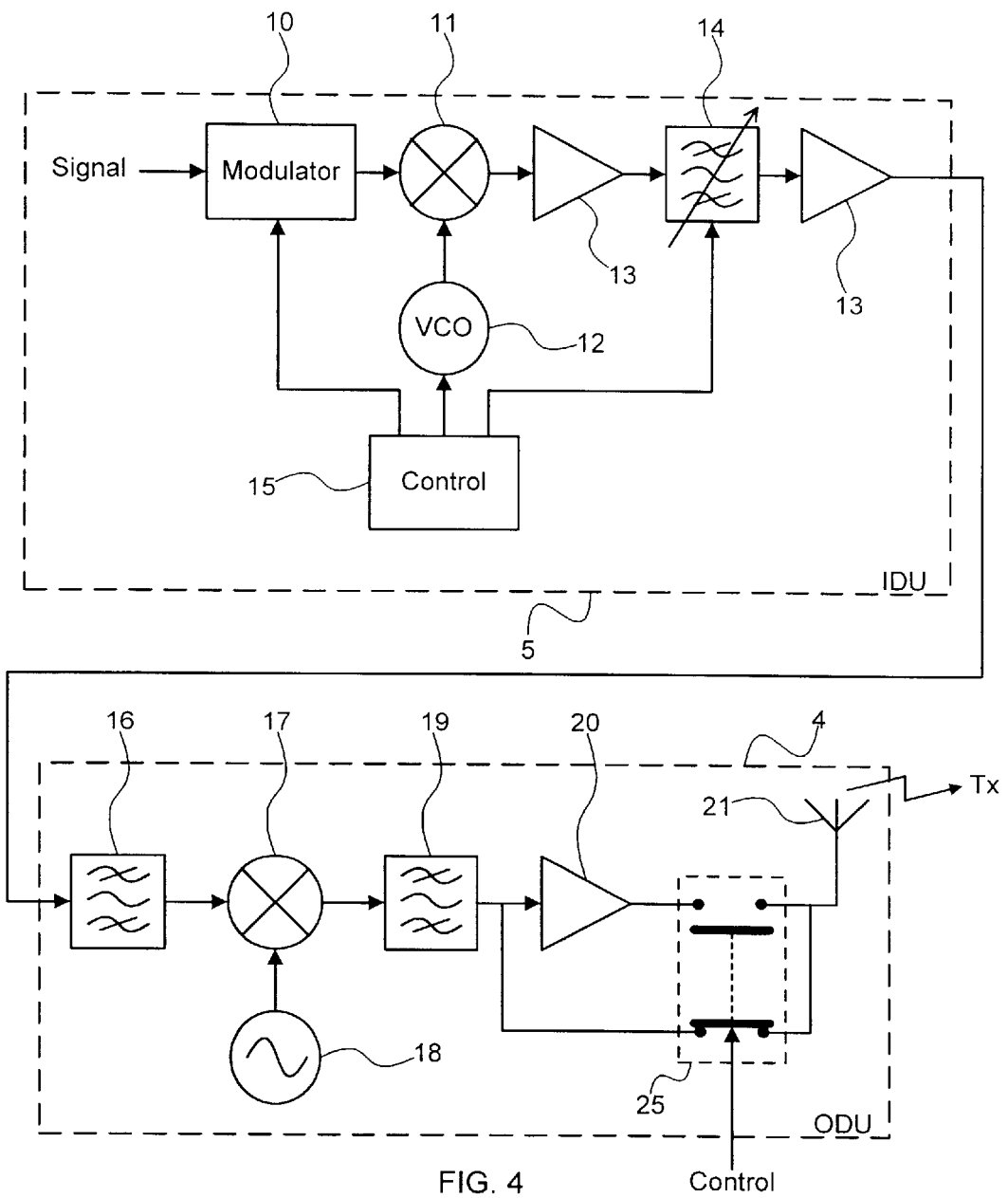
FIGS. 4 and 5 represent the circuits serving for transmission of data of a subscriber terminal of the system of FIG. 1, according to two embodiments of the invention.

FIG. 4 represents an exemplary embodiment of the transmitter part of the device placed at the subscribers home, according to the invention. The internal unit 5 comprises modulation means 10 which receives a modulating signal for transmission from a device (not shown). A mixer 11 is connected to the modulation means 10 so as to transpose the modulated signal into an intermediate frequency band, a voltage-controlled oscillator 12 delivering the transposition signal. The frequency delivered by the oscillator 12 is determined by a supervisory circuit 15 as a function of the channel used in the intermediate frequency band. The intermediate frequency band lies for example between 0.4 and 0.7 GHz and is for example divided into channels of 2 MHz width. The output of the mixer 11 is coupled to an amplification facility which comprises one or more amplifiers 13 and a variable-gain attenuation circuit 14. The supervisory circuit 15 sends the various control signals to the modulation means 10 to the controlled oscillator 12 and to the attenuation circuit 14. The supervisory circuit is for example a microcontroller type circuit. A coaxial cable is connected at the output of the amplification facility so as to transport the signal to the external unit 4.

The external unit 4 comprises a first filter 16 connected to the coaxial cable and to a mixer 17. A local oscillator 18 delivers a transposition frequency to the mixer, for example of 41.8 GHz, so as to obtain a transmission band lying between 42.2 and 42.5 GHz. A second filter 19 eliminates the image frequencies originating from the mixer 17. An SSPA (standing for Solid State Power Amplifier) type amplifier 20 amplifies the signal before delivering it to an antenna 21. A switching circuit 25 is connected between the amplifier 20 and the antenna 21 in such a way that as a function of a command the switching circuit effects a connection between the antenna 21 and the output of the amplifier 20 or between the antenna 21 and the input of the amplifier 20.

The switching circuit 25 makes it possible to utilize an exemplary extra gain of 20 dB from amplifier 20 or to bypass the amplifier and provide a lower signal level to antenna 21. Amplifying or bypassing the signal before transmitting it via the antenna 21 does not affect the signal-to-noise ratio. In this first example, switching circuit 25 is for example a manual switch having a position determined as a function of the distance between the broadcasting station 1 and the location of the subscriber device.

The variable-gain attenuation circuit 14 makes it possible to have a range of variation of for example 35 dB in the transmission power and the amplifier 20 makes it possible to shift this range of variation by 20 dB. The system has an overall range of variation of 55 dB formed by two subranges of 35 dB which overlap over 15 dB. Referring to FIG. 2, it may be appreciated that the system operates very well in a fixed position with a manual switch which is correctly positioned during installation.

However, if during installation the switch is poorly positioned, or a severe climatic variation occurs, proper operation may be impaired. Likewise, if the environment between the subscriber and the broadcasting station changes appreciably, and if the subscriber is placed at a critical distance, it is possible to have to change the positioning of the switch of the external unit which is not necessarily accessible. Furthermore, a device becomes unusable when employed from a non-stationary location, for example in an outside-broadcasting van.

Figure 5:
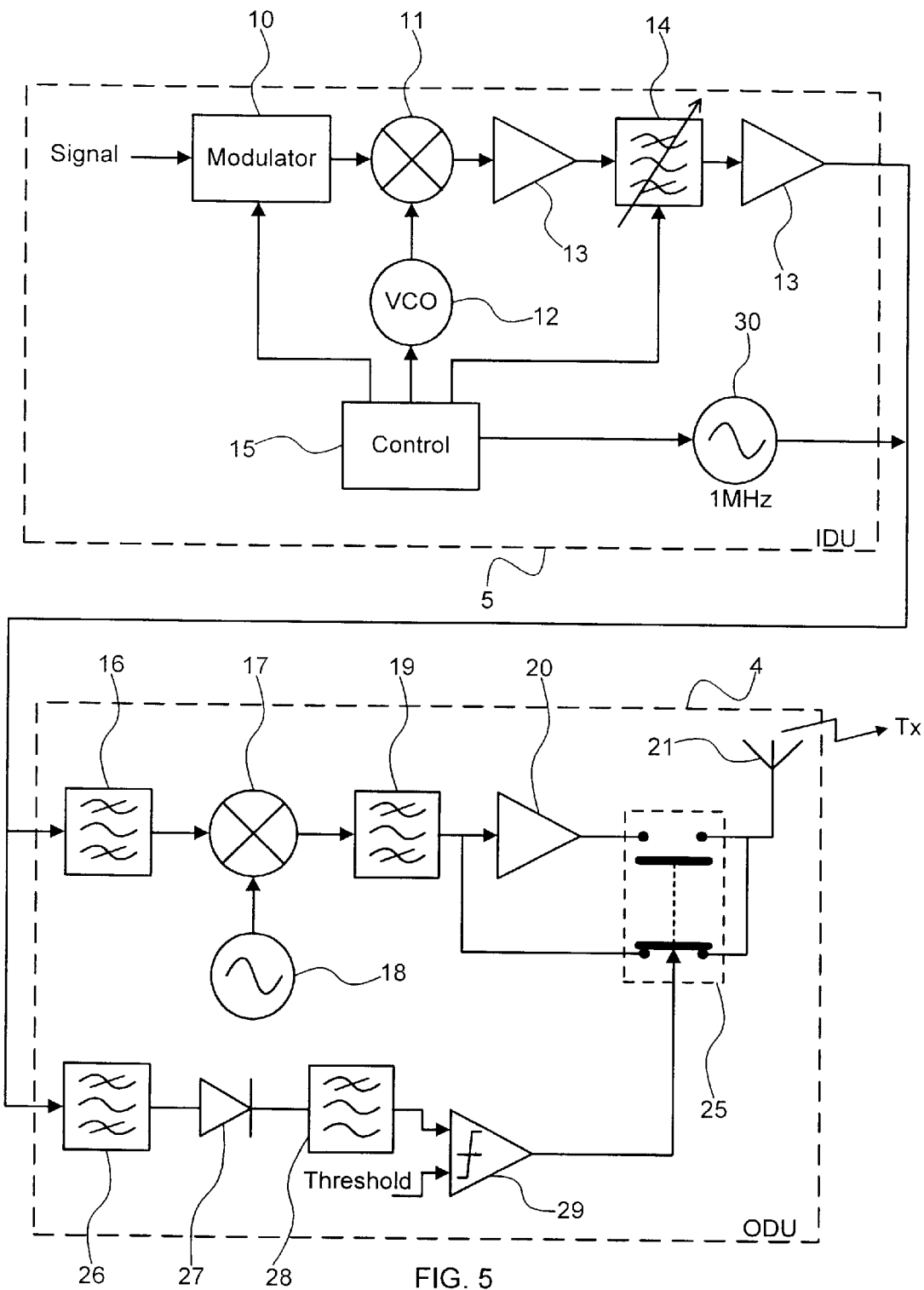

A second embodiment makes it possible to remedy all these drawbacks by controlling the switching circuit with the aid of the supervisory circuit of the internal unit 5. The second embodiment is represented in FIG. 5. In this FIG. 5, the internal unit 5 comprises a switched oscillator 30 which generates a switching signal of predefined frequency, for example 1 MHz on the coaxial cable. The oscillator being switched or otherwise controlled as a function of a signal originating from the supervisory circuit 15. The presence or the absence of the sinusoidal switching signal indicates to the external unit whether the amplifier 20 is to be in circuit or is to be bypassed. The supervisory circuit 15 determines as a function of the requirement whether or not amplifier 20 is in circuit or is bypassed. The presence or the absence of the sinusoidal signal indicates to the external unit whether the amplifier 20 is or is not to be short-circuited. The supervisory circuit 15 determines as a function of the requirement whether or not it is necessary to short-circuit the amplifier 20.

The external unit 4 is modified so as to be able to receive the sinusoidal signal and transform it into a command for the switching circuit 25. The switching circuit 25 is, for example, a PIN-diode switch which receives a control signal.

The external unit 4 comprises a third filter 26, of band-pass type, centred on the frequency of 1 MHz and connected to the coaxial cable. This filter makes it possible to isolate the sinusoidal switching signal which serves as command. A rectifying circuit 27, for example a diode, is connected at the output of the third filter 26. A fourth filter 28, of low-pass type, is connected to the output of the rectifying circuit 27 so as to recover the DC component of the rectified signal. A shaping circuit 29 is connected to the output of the fourth filter 28 and is, for example, a comparator which compares the rectified DC voltage which exits the fourth filter with a predefined threshold. The output signal from the shaping circuit 29 is the control signal for the switching circuit 25.

With such a system, the supervisory circuit 15 of the internal unit has a range of variation of 55 dB. However, in order to preclude any transmission problem, the switching of the amplifier 20 is carried out, preferably, between two bursts of data.

Other control possibilities can be envisaged. It is, for example, possible to use a dedicated conductor for control but this has the effect of being more expensive in terms of electrical wire.

Figure 6:
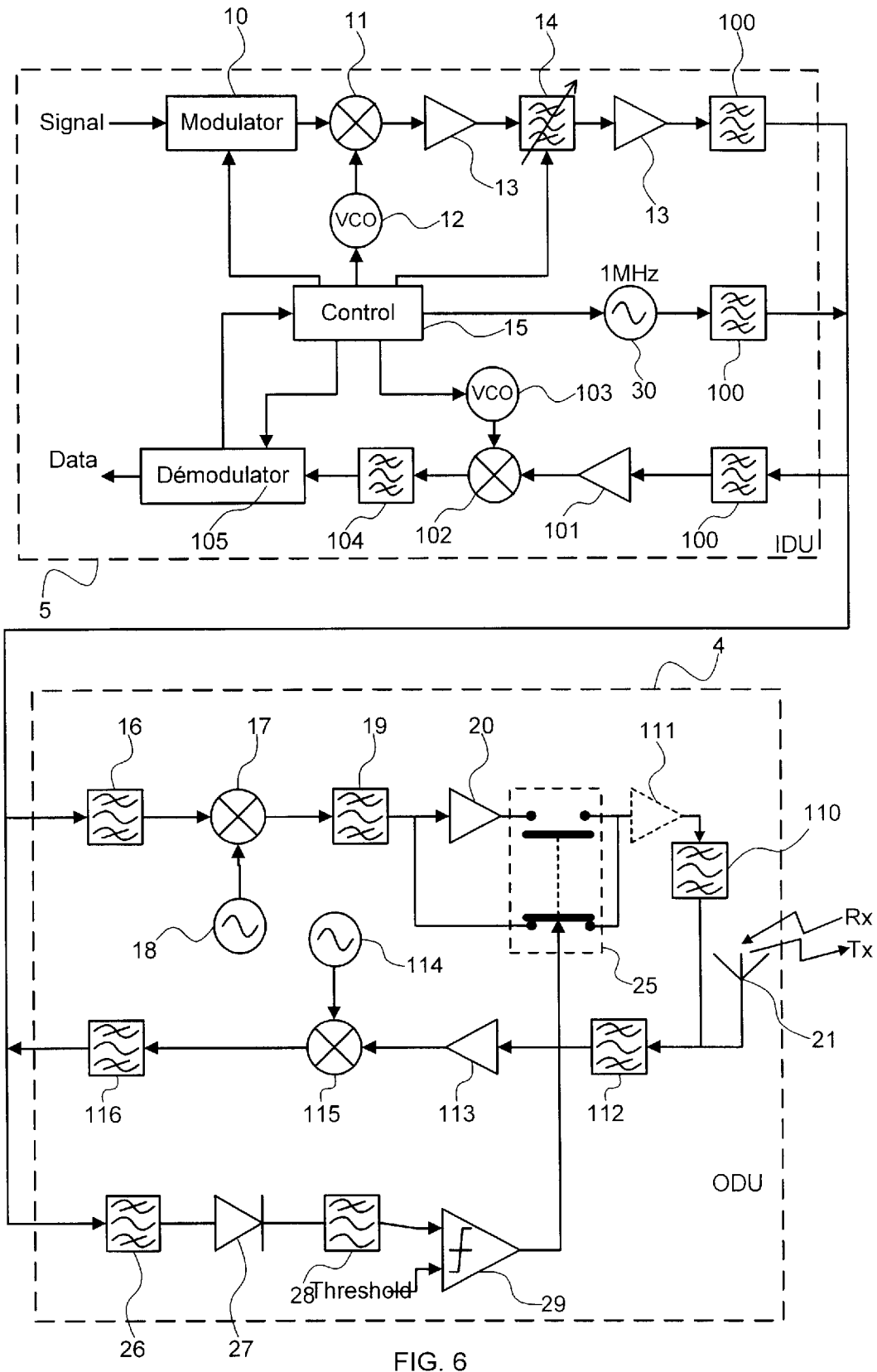
FIG. 6 represents an example of integrating the transmission circuits and reception circuits of a subscriber terminal of the system of FIG. 1, according to the invention.

Other possibilities of implementation can be envisaged. By way of example, FIG. 6 represents an embodiment in which one and the same antenna is used for transmission and reception.

In addition to the elements described above, the internal unit 5 comprises separation filters 100A, B, C, which are band-pass filters intended for separating the signals sent to the external unit 4 and the signals received from the external unit 4. The separation filters cater for the frequency multiplexing on the coaxial cable for the internal unit. A first of the separation filters 100A is connected between the amplifier 13 and the coaxial cable so as to allow through the band lying between 0.4 and 0.7 GHz. A second separation filter 100B is connected between the switched oscillator 30 and the coaxial cable so as to allow through a narrow band centred on 1 MHz. A third separation filter 100C is connected to the coaxial cable so as to receive and allow through an intermediate frequency band for reception lying between 0.95 and 1.95 GHz.

An amplifier 101 is connected to the third separation filter 100C. A mixer 102 carries out a transposition of the amplified signal into a baseband, a voltage-controlled oscillator 103 delivering the transposition signal. The frequency delivered by the oscillator 12 is determined by a supervisory circuit 15 as a function of the channel used in the intermediate frequency band for reception. The intermediate frequency band for reception is for example divided into channels of 33 MHz width. A filter 104 connected to the output of the mixer 102 eliminates the image frequencies. A demodulation circuit 105 transforms the signal leaving the filter 104 into a data stream.

The external unit 4 comprises the elements described above for the transmission facility and for the control of the switching circuit 25. An extra filter 110 is added between the antenna 21 and the switching circuit 25 so as to reduce the coupling between transmission and reception. An extra low-noise amplifier 111 can be added into the transmission facility if it is necessary to have an amplification when the amplifier 20 is short-circuited. The amplifier 111 may be placed at various points in the transmission facility.

The external unit 4 also includes a reception facility. The reception facility comprises a first filter 112 connected to the antenna 21. The first filter 112 is of band-pass type with strong rejection so as to allow through for example the band lying between 40.5 and 41.5 GHz. A low-noise amplifier 113 amplifies the filtered signal. A local oscillator 114-delivers a signal at a transposition frequency, for example equal to 40.2 GHz. A mixer 115 performs the transposition of the amplified signal with the aid of the signal delivered by the local oscillator 114 so that the useful signal is situated in the intermediate frequency band lying for example between 0.95 and 1.95 GHz. A second filter 116 is placed between the output of the mixer and the coaxial cable so as to remove the image frequencies.

Numerous other possibilities of implementation are possible. In particular, the frequencies indicated are done so purely by way of indication. The person skilled in the art may also use other architectures for the transmission and reception facilities, in particular architectures with common oscillator between transmission and reception.

What is claimed is:

1. A transmission device comprising:
    a first unit for modulating data for transmission;
    a transposing means for transposing the modulated data to an intermediate frequency band;
    a variable attenuator coupled for attenuating the modulated data transposed to an intermediate frequency band;
    a second unit for receiving the intermediate frequency band and transposing at least one intermediate band signal to a transmission frequency band;
    at least one amplifier for amplifying the modulated data having a transmission frequency; and,
    a switching circuit coupled to the at least one amplifier and to an antenna for selectably coupling the antenna to one of an output of the at least one amplifier and an input of the at least one amplifier.

2. The transmission device of claim 1, wherein the first unit comprises a switching signal generator for coupling to the switching circuit of the second unit.

3. The transmission device of claim 2, wherein the second unit comprises a switching signal receiver for receiving the switching signal and generating a control signal for the switching circuit.

4. The transmission device of claim 2, wherein the switching signal has first and second conditions respectively, in the first condition the switching signal presence is indicative of one of the switching circuit coupling the antenna to one of an output of the at least one amplifier, and to an input of the at least one amplifier, and in the second condition the switching signal is absent and indicative of one of the switching circuit coupling the antenna to an input of the at least one amplifier and to one of an output of the at least one amplifier.

5. The transmission device of claim 1, wherein the variable attenuation means has a range of attenuation greater than the gain of the at least one amplifier.

6. A transmission/reception device having first and second interconnected units, wherein the first unit comprises:
    a modulator for modulating input data;
    a first transposing device for transposing the modulated data to an intermediate frequency band;
    a variable attenuator for controlling the modulated data transposed to the intermediate frequency band;
    a second transposing device for transposing received data;
    a demodulator coupled to the second transposing device for demodulating the transposed received data; and,
    wherein the second unit comprises;
    a third transposing device for transposing at least one intermediate band modulated data signal to a transmission frequency band;
    a fourth transposing device for transposing at least one signal received in a reception band to the intermediate band;
    at least one amplifier coupled to an antenna for transmission of the modulated data signal transposed to the transmission frequency band; and,
    a switching circuit coupled to the at least one amplifier and to the antenna for coupling the antenna to ones of an output of the at least one amplifier and an input of the at least one amplifier.

7. The transmission/reception device of claim 6, wherein the first unit comprises means for delivering a switching signal to the second unit and wherein the second unit comprises a receiving means for receiving the switching signal and controlling the switching circuit.

8. The transmission/reception device of claim 7, wherein a presence of the switching signal indicates a first condition of the switching circuit and an absence of the switching signal indicates a second condition of the switching circuit.

9. The transmission/reception device of claim 6, wherein the variable attenuation means has a range of attenuation greater than the gain of the at least one amplifier.

10. A transmission device comprising:
    an indoor unit for modulating data for transmission, said indoor unit including: a transposing means for transposing the modulated data to an intermediate frequency band; and a variable attenuator coupled for attenuating the modulated data transposed to an intermediate frequency band;

an outdoor unit for receiving the intermediate frequency band and transposing at least one intermediate band signal to a transmission frequency band, said outdoor unit including:

at least one amplifier for amplifying the modulated data having a transmission frequency; and, a switching circuit coupled to the at least one amplifier and to an antenna for selectably coupling the antenna to one of an output of the at least one amplifier and an input of the at least one amplifier;

a cable linking the indoor and the outdoor unit.

11. The transmission device of claim 10, wherein the indoor unit comprises a switching signal generator for coupling to the switching circuit of the outdoor unit.

12. The transmission device of claim 11, wherein the outdoor unit comprises a switching signal receiver for receiving the switching signal and generating a control signal the switching circuit.

13. The transmission device of claim 11, wherein the switching signal has first and second conditions respectively, in the first condition the switching signal presence is indicative of one of the switching circuit coupling the antenna to one of an output of the at least one amplifier, and to an input of the at least one amplifier, and in the second condition the switching signal is absent and indicative of one of the switching circuit coupling the antenna to an input of the at least one amplifier and to one of an output of the at least one amplifier.

14. The transmission device of claim 10, wherein the variable attenuation means has a range of attenuation greater than the gain of the at least one amplifier.

15. A transmission/reception device having an indoor unit and an outdoor unit interconnected by mean of a cable, wherein the indoor unit comprises:

a modulator for modulating input data;

a first transposing device for transposing the modulated data to an intermediate frequency band;

a variable attenuator for controlling the modulated data transposed to the intermediate frequency band;

a second transposing device for transposing received data;

a demodulator coupled to the second transposing device for demodulating the transposed received data; and, wherein the outdoor unit comprises;

a third transposing device for transposing at least one intermediate band modulated data signal to a transmission frequency band;

a fourth transposing device for transposing at least one signal received in a reception band to the intermediate band;

at least one amplifier coupled to an antenna for transmission of the modulated data signal transposed to the transmission frequency band; and, a switching circuit coupled to the at least one amplifier and to the antenna for coupling the antenna to ones of an output of the at least one amplifier and an input of the at least one amplifier.

16. The transmission/reception device of claim 15, wherein the indoor unit comprises means for delivering a switching signal to the second unit and wherein the outdoor unit comprises a receiving means for receiving the switching signal and controlling the switching circuit.

17. The transmission/reception device of claim 16, wherein a presence of the switching signal indicates a first condition of the switching circuit and an absence of the switching signal indicates a second condition of the switching circuit.

18. The transmission/reception device of claim 15, wherein the variable attenuation means has a range of attenuation greater than the gain of the at least one amplifier.

* * * * *